US006292339B1

(12) United States Patent
Brooks

(10) Patent No.: US 6,292,339 B1
(45) Date of Patent: Sep. 18, 2001

(54) OUTPUT PROTECTION FOR ARC DISCHARGE LAMP BALLAST

(76) Inventor: Douglas William Brooks, 1502 Continental, Carson City, NV (US) 89701

( * ) Notice: Subject to any disclaimer, the term of this patent is extended or adjusted under 35 U.S.C. 154(b) by 0 days.

(21) Appl. No.: 09/274,489

(22) Filed: Mar. 23, 1999

(51) Int. Cl.[7] ...................................................... H02H 3/18

(52) U.S. Cl. ............................. 361/78; 361/87; 361/93.6; 315/136

(58) Field of Search ................................. 361/78, 85, 87, 361/93.1, 93.6; 315/136, 290

(56) References Cited

U.S. PATENT DOCUMENTS 4,810,936 * 3/1989 Nuckolls et al. .................... 315/119

* cited by examiner

*Primary Examiner*—Michael J. Sherry
(74) *Attorney, Agent, or Firm*—Natan Epstein, Beehler & Pavitt

(57) ABSTRACT

Output protection for arc discharge lamp ballasts is provided by applying sampled ballast current to a burden capacitor selected to present a low impedance across the winding to a substantially symmetrical waveform of the sample current. Asymmetry between the positive and negative half-cycles of the sample waveform, such as partial rectification caused by abnormal lamp operation, results in charge buildup across the capacitor. Sufficient charge buildup actuates a ballast disabling switch such as a silicon controlled rectifier.

12 Claims, 2 Drawing Sheets

OUTPUT PROTECTION FOR ARC DISCHARGE LAMP BALLAST

BACKGROUND OF THE INVENTION

1. Field of the Invention

This invention pertains to the field of ballast circuits for powering arc discharge lamps, and is more particularly directed to a fault protection circuit for turning off ballast output power to the lamp load in the event of lamp malfunction.

2. State of the Prior Art

Arc discharge lamps such as fluorescent lamps require relatively high operating voltages, particularly when first initiating the arc discharge in the lamp. Once started, the lamp current must be externally limited to a normal level because arc lamp impedance characteristically drops after start-up. Many so called ballast circuits have been devised for supplying the necessary voltages and currents for powering such lamps.

Arc discharge lamps, for example fluorescent lamp tubes, are subject to certain types of malfunction characteristic of this type of lamp. If the lamp tube is loosened from its electrical socket the lamp connectors or pins may become sufficiently exposed to sustain an arc discharge between the exposed metal parts. Such an arc discharge is undesirable not only because it can severely stress the electrical components of the ballast circuit, but may also pose a fire and electrical shock hazard. Under such circumstances, it is, of course, desirable to shut down electrical power to the lamp immediately. Another type of lamp malfunction occurs with aging of the discharge lamp, manifested by partial rectification of the A.C. current delivered by the ballast to the lamp load. In this case too it is desirable to interrupt electrical power to the lamp load in order to call the attention of maintenance personnel to the need for replacing the lamp. Ballast output protection is particularly needed in arc discharge lamp fixtures installed in aircraft cabin lighting and other vehicles where lighting fixtures are subject to shock and vibration. Lamps shaken loose from their sockets frequently result in arcing and occasionally in fires when the lamp contacts become exposed. In the interest of safety it is desirable to minimize the possibility of lamp arcing, not only on public transportation of all kinds, but wherever arc discharge lighting is used.

Various schemes have been devised for sensing abnormal operating conditions of the lamp load in arc discharge fixtures and shutting down the output of the ballast in such event. For example, it is known that certain failure modes, particularly arcing, result in abnormally high transient voltages and currents through the lamp load. This knowledge has been exploited in the past to design protection circuits responsive to such higher than normal voltages or currents. In one known type of protection circuit a voltage comparator has one input connected for sensing the lamp voltage and the other input referenced to a fixed, preset voltage threshold. The output of the comparator is connected for switching off the ballast output in the event that the lamp voltage exceeds the treshhold voltage. An improved form of this type of output protection circuit, intended for use with variable lamp loads, is disclosed in a commonly assigned copending application.

In general the sensing of lamp fault conditions in arc discharge lighting has proven to be a challenging task. Although many solutions have been proposed many are too complex or costly to implement on a large commercial scale. A successful solution must be not only dependable but also economically viable in the highly competitive and cost sensitive interior lighting industry. Furthermore, the ballast output protection must work reliably with so called universal ballasts intended to supply lamp loads of different wattage, as well as with dimmable ballasts which deliver a variable lamp current for adjustable illumination.

SUMMARY OF THE INVENTION

The aforementioned need is addressed by this invention which provides a simple output protection circuit which can be economically incorporated into a wide variety of ballast circuit topologies. The novel output protection circuit for an arc discharge lamp ballast includes a winding arranged and configured for inductively sampling a high frequency output current of the ballast to derive a sample current. A burden capacitor is connected across the winding, the capacitor being selected to present a low impedance across the winding to a substantially symmetrical waveform of the sample current. A switch element is actuated by a charge buildup on the burden capacitor due to asymmetry in the sample current waveform, the switch element being connected for shutting-off power supplied by the ballast to an arc discharge lamp. The switch element may be a silicon controlled rectifier having a gate connected to the burden capacitor so that the silicon controlled rectifier turns on in response to the charge buildup on the burden capacitor. For example, the silicon controlled rectifier may be connected for bringing low the base of one or more drive transistors of the ballast thereby to switch-off the drive transistors and consequently shut-off power ballast to the lamp in response to a charge buildup on the burden capacitor.

The invention may also be understood as having circuit means connected for applying an unrectified alternating current sample waveform representative of an output waveform of the ballast to a burden capacitor, and switch means connected for shutting-down the ballast responsive to a sufficient charge buildup across the capacitor due to a degree of asymmetry between positive and negative half-cycles of the sample waveform indicative of an abnormal operating condition of a lamp load connected to the ballast. Alternatively, the invention may also be expressed as a method for protecting a ballast circuit against an abnormal operating condition of an arc lamp load powered by the ballast circuit, the method comprising the steps of applying a sample waveform representative of an output waveform of the ballast to a burden capacitor, and disabling the output of the ballast circuit responsive to a sufficient charge buildup across the capacitor due to a degree of asymmetry between positive and negative half-cycles of the sample waveform indicative of an abnormal operating condition of a lamp load connected to the ballast. The ballast disabling switch may be a silicon controlled rectifier connected for disabling output power from the ballast circuit and the sufficient charge buildup is the charge required to actuate said switch by changing the state of the silicon controlled rectifier.

In a broader sense the invention is an output protection circuit for an arc discharge lamp ballast includes a first element or circuit for sampling an output waveform of the ballast, a second element or circuit for sensing asymmetry in the output waveform and a switch connected for shutting-down the output of the ballast responsive to a sufficient degree of asymmetry in the output waveform. That is, the output protection circuit 30 is stand-alone to the ballast circuit topology.

The invention may be also understood as a method for sensing an abnormal operating condition of an arc lamp load powered by a ballast circuit, comprising the steps of sampling an output waveform of the ballast, assessing the degree of asymmetry in the output waveform, and declaring an abnormal operating condition upon exceeding a predetermined degree of asymmetry. The step of assessing may be performed by charging a capacitor with the output waveform and the predetermined degree of asymmetry may be determined by a charge on the capacitor sufficient to actuate a ballast disabling switch connected to the capacitor. The ballast disabling switch may be a silicon controlled rectifier and the aforementioned sufficient charge the potential across the burden capacitor required to switch the state of the silicon controlled rectifier, for example, from an off state to an on state.

These and other improvements, features and advantages will be better understood from the following detailed description of the preferred embodiment taken in conjunction with the accompanying drawings.

DETAILED DESCRIPTION OF THE PREFERRED EMBODIMENTS

Figure 1:
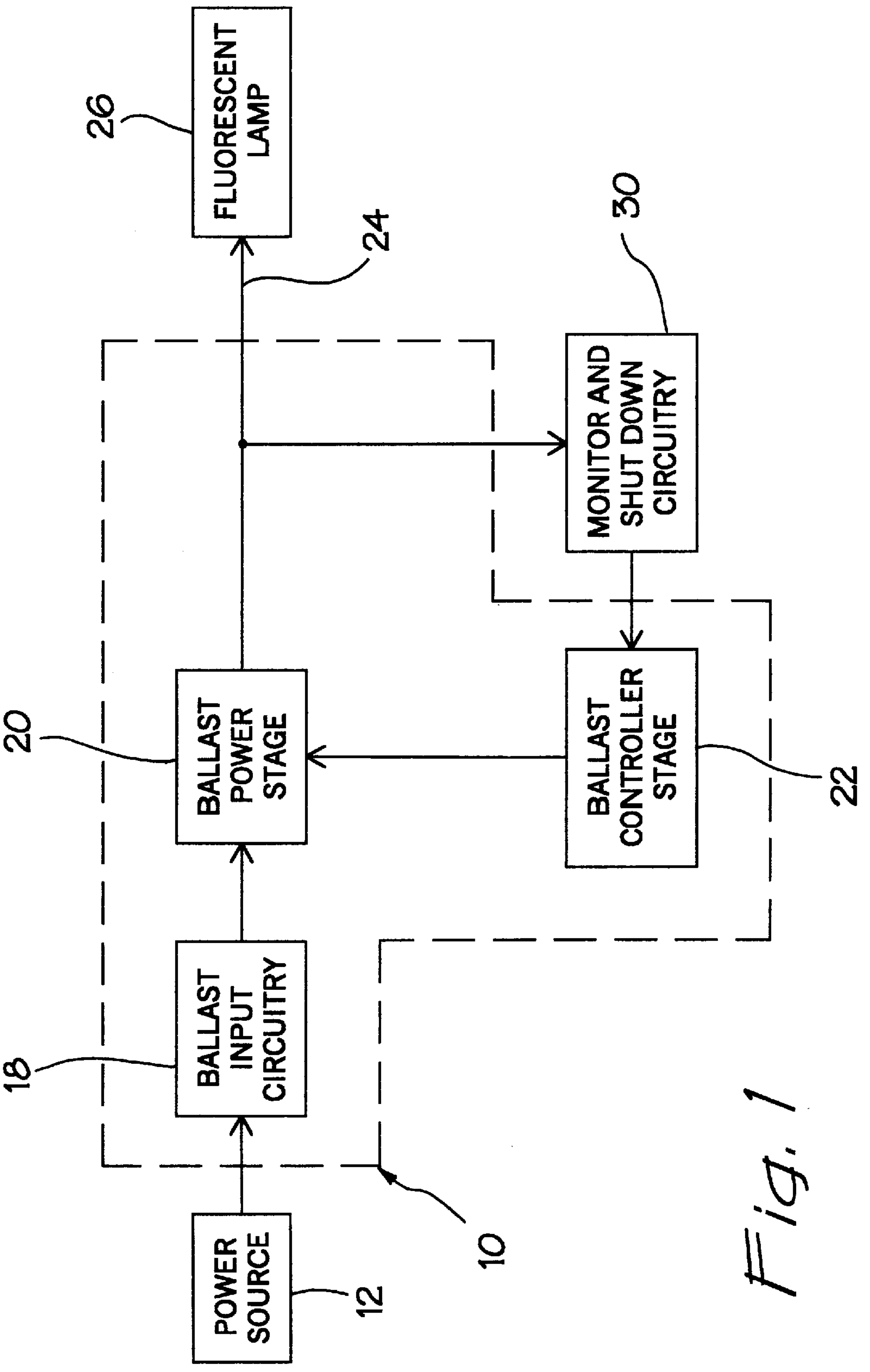
FIG. 1 is a block circuit diagram of a typical electronic ballast for arc discharge lamps equipped with an output protection monitoring and shut-down circuit.

With reference to the accompanying drawings, FIG. 1 is a generalized circuit diagram of an electronic ballast 10 supplied by a power source 12 and connected for powering an arc discharge lamp load 26 connected to the ballast output 24. The electronic ballast 10 may be of any one of various known ballast circuit topologies and its operation need not be described in detail inasmuch as such units are known and understood. In general, the ballast circuit 10 receives low-voltage low-frequency A.C. electrical power from power source 12 through ballast input circuitry 18 which may include an electromagnetic interference filter and a rectifier, for example, for converting the A.C. input to D.C. power. The D.C. is then converted to high frequency A.C. by the ballast power stage 20, controlled by ballast controller stage 22, to derive a high-frequency high-voltage A.C. power at the ballast output 24, typically high frequency, e.g. 25 kHz or 50 kHz power, connected for powering lamp load 26. The present invention improves the ballast circuit 10 by providing a monitoring and shut-down circuit 30 connected for protecting the ballast output in the event of an abnormal operating condition of the lamp load 26. It is of course advantageous to incorporate the circuit 30 as part of the ballast unit.

Figure 2:
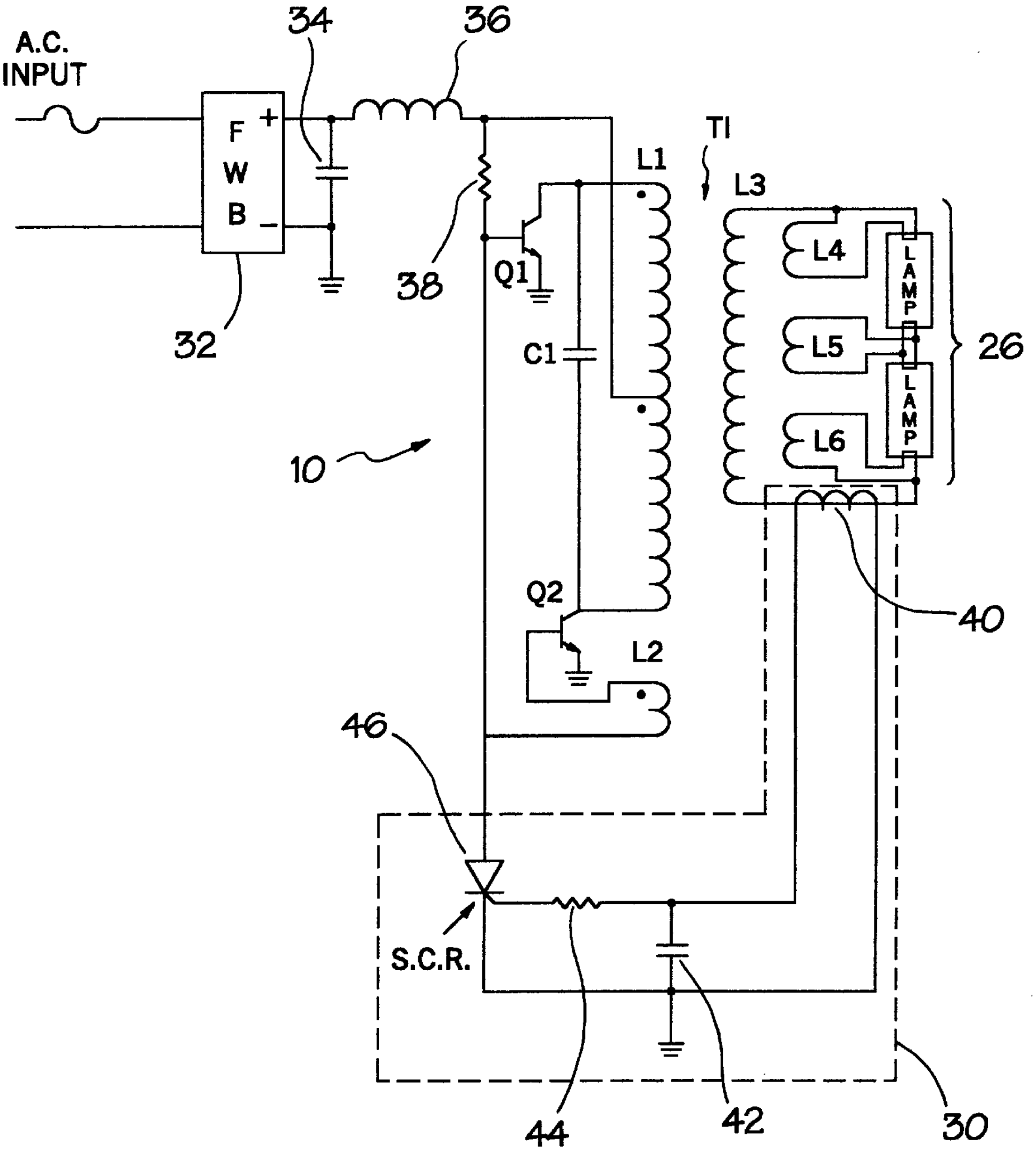
FIG. 2 is a circuit diagram illustrating a typical push-pull electronic ballast equipped with a fault protection circuit according to this invention.

FIG. 2 is a simplified circuit diagram of a push-pull type ballast 10, a commonly used ballast topology. Full-wave bridge 32 rectifies low-voltage low-frequency A.C. input power. The rectified A.C. is filtered by capacitor 34 and inductor 36. The resulting D.C. power is converted to high frequency A.C. by push-pull transistors Q1, Q2 at a frequency partly determined by resonant tank circuit L1, C1 where L1 is the primary winding of power transformer T1. A feedback or tickler winding L2 and bias resistor 38 set the operating parameters of the push-pull transistor pair. The secondary or output winding L3 of power transformer T1 supplies the high voltage required for starting and sustaining an arc discharge through the lamp load 26 which in the example of FIG. 2 is shown as a pair of lamp tubes connected in series. Low-voltage secondary windings L4, L5 and L6 provide filament current for the arc lamp electrodes.

The fault monitoring and ballast shut-down circuit 30 of this invention includes a sniffer winding 40 positioned for inductively sampling the lamp current delivered by the ballast output 24, i.e. by the secondary winding L3 to the lamp load 26 in order to derive a sample current representative of the lamp current. A burden capacitor 42 is connected across the winding 40 so that an unrectified alternating current sample waveform is applied to opposite plates of capacitor 42. Capacitor 42 is selected to have a low, preferably very small impedance at the high-frequency A.C. power output of the ballast 10, so that the capacitor 42 effectively constitutes a short circuit across the winding 40 at that frequency. The lower end of capacitor 42 is grounded at Gnd. and the top end of the capacitor is connected through gate resistor 44 to the gate of silicon controlled rectifier (SCR) 46. The anode of SCR 46 is connected to the base of each transistor in push-pull pair Q1, Q2 while the SCR cathode is grounded to Gnd.

The ballast circuit 10 delivers an output waveform which is substantially symmetrical in its positive and negative going swings or half-cycles above and below the zero voltage axis. During normal lamp operation this output waveform remains substantially symmetrical, that is, the symmetry of the waveform is not significantly affected by the lamp load. Under such conditions the sample current, whose symmetry reflects the symmetry of the lamp current, does not appreciably charge the burden capacitor 42 because the symmetrical positive and negative half-cycles of the A.C. current contribute a net zero electrical charge.

Arc discharge lamps approaching the end of their operational life span no longer conduct current equally in both directions through the lamp, causing partial rectification of the A.C. lamp current by lamp load 26. This results in a D.C. component imposed upon the A.C. current which distorts the symmetry of the lamp current waveform. The distortion in symmetry is reflected in the sample current through winding 40, causing a net charge build up on burden capacitor 42. If a sufficient voltage potential develops across the capacitor the gate of SCR 46 triggers through resistor 44 and turns on the SCR. When SCR 46 turns on the bases of transistors Q1, Q2 are brought low, shutting off the push-pull drive stage and disabling the ballast.

Another source of distortion in waveform symmetry of the lamp current is the unstable arcing that can develop due to a loose or broken lamp connection, a wiring mishap or a broken lamp. This type of distortion may be caused, for example, by a still higher frequency component, e.g. 500 kHz radio frequency energy generated by the arcing and picked-up by the winding 40 and superposed on the e.g. 25 kHz or 50 kHz ballast output frequency. The result here also is a net charge build-up across capacitor 42 capable of developing a sufficient potential for triggering the SCR gate and turning on SCR 46 to disable the ballast output as just described.

From the foregoing it will be understood that the invention may be generally understood as a method for sensing and detecting an abnormal operating condition of the lamp load supplied by an arc discharge ballast by monitoring the symmetry of the current flow through the lamp load by sampling an output waveform of the ballast, assessing the degree of asymmetry in the waveform, and declaring an abnormal operating condition upon exceeding a predetermined degree of asymmetry. These steps correspond to the operation of the circuit 30 described above. Monitoring is accomplished by deriving a sample current, as by inductively sampling with a current transformer 40; assessing waveform asymmetry is performed by charging capacitor 42 with the sample waveform and the predetermined degree of asymmetry is determined by a charge on capacitor 42 sufficient to trigger the gate of the SCR and switch the state of the SCR. The SCR 46 functions as a ballast disabling switch actuated by a sufficient distortion of the ballast output waveform.

The invention is not limited to a silicon controlled rectifier or any particular switching device or circuit as a means for disabling the ballast output. Also, while capacitor 42 provides a simple and inexpensive means for sensing waveform asymmetry other circuits may be used for this purpose. Furthermore, the fault monitoring and ballast shut-down circuit 30 of this invention is not restricted to use with any particular ballast circuit topology, and in general may be applied to any ballast which can be shut-down by means of a suitable switch actuated by a potential or a current resulting from an asymmetrical waveform condition in the ballast output current.

For this reason, although a particular embodiment of the invention has been described and illustrated for purposes of clarity and example, it must be understood that many changes, substitutions and modifications to the described embodiments will be apparent to those having no more than ordinary skill in the art without thereby departing from the invention as defined in the following claims.

What is claimed is:

1. An output protection circuit for an arc discharge lamp ballast, comprising:

a winding arranged and configured for inductively sampling a high frequency output current of the ballast to derive a sample current, a burden capacitor connected across said winding, said capacitor selected to present a low impedance across the winding to a substantially symmetrical waveform of said sample current, switch means actuated by a charge buildup on said burden capacitor due to asymmetry in the sample current waveform, said switch means being connected for shutting-off power supplied by the ballast to an arc discharge lamp.

2. The output protection circuit of claim 1 wherein said switch means is a silicon controlled rectifier having a gate connected to said burden capacitor so that said silicon controlled rectifier turns on in response to said charge buildup.

3. The output protection circuit of claim 2 wherein said silicon controlled rectifier is connected for bringing low a base of one or more drive transistors of the ballast thereby to switch off the one or more drive transistors and shut-off power ballast to the lamp in response to a charge buildup on said burden capacitor.

4. An output protection circuit for an arc discharge lamp ballast, first means for sampling an output waveform of the ballast and derive an unrectified alternating current sample waveform, second means for sensing asymmetry between half-cycles of opposite polarity of said sample waveform and switch means connected for shutting-down said ballast responsive to a sufficient degree of said asymmetry.

5. A method for sensing an abnormal operating condition of an arc lamp load powered by a ballast circuit comprising the steps of deriving an unrectified alternating current sample waveform representative of an output waveform of the ballast, assessing the degree of asymmetry between positive and negative half-cycles of said sample waveform, and deriving a switch actuating voltage indicative of an abnormal operating condition upon exceeding a predetermined degree of asymmetry.

6. The method of claim 5 wherein said step of assessing is performed by charging a capacitor with said output waveform and said predetermined degree of asymmetry is represented by a charge on said capacitor sufficient to actuate a ballast disabling switch connected to said capacitor by means of said switch actuating voltage.

7. The method of claim 6 wherein said ballast disabling switch is a silicon controlled rectifier and said sufficient charge is the charge required to switch the state of said silicon controlled rectifier.

8. An output protection circuit for an arc discharge lamp ballast, first means for applying an unrectified alternating current sample waveform representative of an output waveform of the ballast to a burden capacitor, and switch means connected for shutting-down said ballast responsive to a sufficient charge buildup across said capacitor due to a degree of asymmetry between positive and negative half-cycles of said sample waveform indicative of an abnormal operating condition of a lamp load connected to said ballast.

9. The output protection circuit of claim 8 wherein said switch means is a silicon controlled rectifier and said sufficient charge buildup is the charge required to switch the state of said silicon controlled rectifier.

10. A method for protecting a ballast circuit against an abnormal operating condition of an arc lamp load powered by the ballast circuit, said method comprising the steps of applying a sample waveform representative of an output waveform of the ballast to a burden capacitor, and disabling the output of said ballast circuit responsive to a sufficient charge buildup across said capacitor due to a degree of asymmetry between positive and negative half-cycles of said sample waveform indicative of an abnormal operating condition of a lamp load connected to said ballast.

11. The method of claim 10 wherein said step of disabling comprises the step of actuating a ballast disabling switch connected for disabling output power from said ballast circuit and said sufficient charge is the charge required to actuate said switch.

12. The method of claim 11 wherein said switch comprises a silicon controlled rectifier.

* * * * *